United States Patent
Koroly et al.

(10) Patent No.: US 12,297,573 B2
(45) Date of Patent: May 13, 2025

(54) SYSTEMS AND METHODS FOR THROUGH THICKNESS REINFORCEMENT USING ROLL-TO-ROLL VEIL CLOTH

(71) Applicant: ROHR, INC., Chula Vista, CA (US)

(72) Inventors: Christopher C. Koroly, Spring Valley, CA (US); Katherine E. Waugh, San Diego, CA (US); Vijay V. Pujar, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/317,016

(22) Filed: May 12, 2023

(65) Prior Publication Data
US 2024/0376651 A1   Nov. 14, 2024

(51) Int. Cl.
*D04H 18/02* (2012.01)
*D04H 1/46* (2012.01)
*D06H 7/00* (2006.01)

(52) U.S. Cl.
CPC ............... *D04H 18/02* (2013.01); *D04H 1/46* (2013.01); *D06H 7/00* (2013.01)

(58) Field of Classification Search
CPC .......... D04H 18/02; D04H 1/46; D04H 1/498; D04H 18/00; D04H 3/102; D04H 3/105;
(Continued)

(56) References Cited

U.S. PATENT DOCUMENTS 2,004,709 A * 6/1935 Phillips ................. D04H 18/02
                                                28/107
2,930,100 A * 3/1960 Rust, Jr. ................ D04H 18/00
                                                28/107
(Continued)

FOREIGN PATENT DOCUMENTS

AT         399733 B       7/1995
CN        103710885       4/2014
(Continued)

OTHER PUBLICATIONS

English translation EP1132511 A2 (Doc pub Sep. 2001 (Year: 2001).*
(Continued)

*Primary Examiner* — Amy Vanatta
(74) *Attorney, Agent, or Firm* — SNELL & WILMER L.L.P.

(57) ABSTRACT

An apparatus for through thickness reinforcement of a fibrous preform includes an actuating textile needle, a feeder spool configured to supply a veil cloth, and a take up spool. The feeder spool and take up spool can rotate to cause a portion of the veil cloth to translate such that a needled portion of the veil cloth is received by the take up spool and an unneedled portion of the veil cloth is provided for subsequent needling by the textile needle. In this manner, the veil cloth is only momentarily supplied to the fibrous preform for providing the through thickness fibers and removed from the fibrous preform before subsequent processing of the fibrous preform. The textile needle, feeder spool, and take up spool can be mounted to a common apparatus (e.g., a housing) such that the entire assembly is moveable together as a single unit.

12 Claims, 13 Drawing Sheets

(58) Field of Classification Search
CPC .................. D04H 5/02; D04H 13/005; D04H 17/00–17/12; D06H 7/00; B29C 70/54
USPC .......................................................... 28/107
See application file for complete search history.

(56) References Cited

U.S. PATENT DOCUMENTS

| | | | | |
|---|---|---|---|---|
| 3,348,993 | A * | 10/1967 | Sissons | D04H 1/498 428/92 |
| 3,476,636 | A * | 11/1969 | Crosby | D04H 1/498 442/352 |
| 3,506,530 | A * | 4/1970 | Crosby | D04H 1/498 442/352 |
| 3,605,223 | A * | 9/1971 | Barth | D04H 18/00 28/115 |
| 3,725,984 | A * | 4/1973 | Graber | D04H 18/02 28/115 |
| 3,994,762 | A * | 11/1976 | Wrzesien | B29C 70/24 156/181 |
| 4,341,829 | A * | 7/1982 | Gold | D04H 3/04 428/53 |
| 4,891,870 | A * | 1/1990 | Muller | D04H 18/02 28/107 |
| 5,226,217 | A * | 7/1993 | Olry | D04H 18/02 28/107 |
| 5,350,615 | A | 9/1994 | Darrieux | |
| 6,183,583 | B1 | 2/2001 | Duval et al. | |
| 6,360,412 | B1 * | 3/2002 | Duval | D04H 18/02 28/107 |
| 6,767,602 | B1 | 7/2004 | Duval et al. | |
| 7,430,790 | B1 * | 10/2008 | Bowles | D04H 18/02 28/107 |
| 10,578,115 | B2 | 3/2020 | Lander et al. | |
| 10,612,189 | B2 | 4/2020 | Wagner et al. | |
| 11,491,741 | B2 | 11/2022 | Hamlyn et al. | |
| 2006/0288548 | A1 * | 12/2006 | Jean | D04H 18/02 28/107 |
| 2006/0288549 | A1 * | 12/2006 | Jean | D04H 18/02 28/107 |
| 2013/0045654 | A1 * | 2/2013 | von der Fecht | D04H 18/02 28/115 |
| 2014/0121581 | A1 * | 5/2014 | Richardson | A61F 13/00995 28/107 |
| 2018/0274144 | A1 * | 9/2018 | Evrard | D04H 1/46 |

FOREIGN PATENT DOCUMENTS

| | | | | | |
|---|---|---|---|---|---|
| CN | 114561750 | A | * | 5/2022 | |
| CN | 116657334 | A | * | 8/2023 | |
| CN | 116219643 | B | * | 6/2024 | ............. D04H 18/02 |
| DE | 102011016755 | B3 | * | 10/2012 | ............. B23P 19/04 |
| EP | 0767265 | | | 4/1997 | |
| EP | 1132511 | A2 | * | 9/2001 | ............. D04H 18/02 |
| EP | 2339055 | | | 6/2011 | |
| GB | 1384144 | A | * | 2/1975 | ........... D04H 1/4258 |
| GB | 2250519 | | | 6/1992 | |
| GB | 2462534 | | | 2/2010 | |
| KR | 20240008657 | A | * | 1/2024 | |
| WO | 2013190221 | | | 12/2013 | |

OTHER PUBLICATIONS

European Patent Office, European Search Report dated Oct. 8, 2024 in Application No. 24174932.4.
European Patent Office, European Search Report dated Oct. 8, 2024 in Application No. 24174756.7.
Xiaoming Chen et al: "Robot needle-punching path planning for complex surface preforms" Robotics and Computer-Integrated Manufacturing, vol. 52, Aug. 1, 2018, pp. 24-34, ISSN 0736-5845, https://doi.org/10.1016/j.rcim.2018.02.004.

* cited by examiner

SYSTEMS AND METHODS FOR THROUGH THICKNESS REINFORCEMENT USING ROLL-TO-ROLL VEIL CLOTH

FIELD

The present disclosure relates generally to the manufacture of carbon/carbon composites, and, more particularly, to through thickness reinforcement of fibrous preforms for such manufacture.

BACKGROUND

Through thickness reinforced composites (i.e., composites with fibers inserted into the through thickness (or z-) direction of the laminate) generally provide higher interlaminar properties but lower in-plane properties compared to 2D lay-ups. One such example of through thickness reinforcement is needling, where in-plane fibers are moved to turn in the out-of-plane direction into the thickness of the preform using a needling process. Alternative through-thickness reinforcement methods include stitching, tufting, and others that are known to those skilled in the art, which insert a fiber filament (or similar) into the through thickness direction.

SUMMARY

An apparatus for through thickness reinforcement of a fibrous preform is disclosed, in accordance with various embodiments. The apparatus comprises an actuating needle board including a plurality of textile needles extending therefrom, a feeder spool configured to supply a veil cloth, a take up spool configured to receive the veil cloth, a first roller, and a second roller. The first roller is configured to guide the veil cloth from the feeder spool to the second roller, and the second roller is configured to guide the veil cloth from the first roller to the take up spool. The actuating needle board is configured to move with respect to the first roller and the second roller between a retracted position and an extended position for moving through thickness fibers from the veil cloth to the fibrous preform.

In various embodiments, the take up spool is configured to receive a needled portion of the veil cloth.

In various embodiments, the apparatus further comprises a housing, wherein the actuating needle board is configured to move with respect to the housing between the retracted position and the extended position.

In various embodiments, the apparatus further comprises the actuating needle board, the feeder spool, the take up spool, the first roller, and the second roller are mounted to the housing.

In various embodiments, the veil cloth may consist of carbon fiber or oxidized pan fiber.

In various embodiments, the veil cloth may consist of stretch broken carbon fibers.

In various embodiments, the veil cloth may consist of fibrous material such as short carbon fibers in lengths of 5 millimeters to 10 centimeters bound with a binder material.

In various embodiments, the veil cloth may consist of a scrim, veil, woven, non-crimp fabric, unidirectional tape, felt, or similar material.

In various embodiments, the apparatus further comprises a cutting blade configured to cut said through thickness fibers extending between the veil cloth and the fibrous preform as the veil cloth is lifted from the fibrous preform to the take up spool. In various embodiments, the cutting blade is configured to be located between the second roller and the fibrous preform during through thickness reinforcement.

In various embodiments, the apparatus further comprises a fiber tape feed out roller configured to supply a fiber tape between the veil cloth and the fibrous preform. The fiber tape feed out roller can be mounted to the housing together with the other components of the apparatus.

In various embodiments, the apparatus further comprises a first stripper plate configured to be disposed between the veil cloth and the fibrous preform.

In various embodiments, the first stripper plate is configured to space apart the veil cloth from the fibrous preform to aid in complete through thickness fiber separation from the veil cloth prior to insertion of the through thickness fiber into the fibrous preform.

In various embodiments, the apparatus further comprises a third roller mounted to the first stripper plate, and a fourth roller mounted to the first stripper plate.

In various embodiments, the apparatus further comprises a second stripper plate configured to be disposed between the veil cloth and the actuating needle board, wherein the second stripper plate is configured to at least partially receive the plurality of textile needles.

In various embodiments, the housing comprises an attachment member for coupling the housing to a robotic arm.

In various embodiments, the actuating needle board is located between the feeder spool and the take up spool.

A method for performing a through thickness reinforcement process on a fibrous preform is disclosed, in accordance with various embodiments. The method comprises moving a plurality of needles from a retracted position to an extended position with respect to a housing, penetrating a veil cloth and the fibrous preform with the plurality of needles, moving a through thickness fiber from the veil cloth at least partially into the fibrous preform in response to the fibrous preform being penetrated with the plurality of needles, moving the plurality of needles from the extended position to the retracted position, rotating a feeder spool and a take up spool to move the veil cloth with respect to the fibrous preform, and lifting a needled portion of the veil cloth from the fibrous preform in response to the feeder spool and the take up spool rotating.

In various embodiments, the method further comprises cutting the through thickness fiber with a cutting blade while the veil cloth is being lifted from the fibrous preform.

In various embodiments, the method further comprises supplying a fiber tape from a fiber tape feed out roller to between the veil cloth and the fibrous preform. The fiber tape can be supplied from the roller during through thickness reinforcement as the plurality of needles are moved with respect to the fibrous preform. Stated differently, the fiber tape can be applied in situ to the fibrous preform.

In various embodiments, the method further comprises compressing the veil cloth between a first roller and the fibrous preform, wherein the veil cloth is guided by the first roller in response to the feeder spool and the take up spool rotating.

In various embodiments, the method further comprises securing the veil cloth parallel with the fibrous preform using the first roller and a second roller.

In various embodiments, the method further comprises separating the veil cloth from the fibrous preform using a first stripper plate, wherein the first stripper plate is configured to receive the plurality of needles therethrough.

In various embodiments, the method further comprises compressing the veil cloth against the fibrous preform with a second stripper plate, wherein the second stripper plate is configured to receive the plurality of needles therethrough.

An apparatus for through thickness reinforcement of a fibrous preform is disclosed, in accordance with various embodiments. The apparatus comprises a housing, a feeder spool configured to supply a veil cloth, a take up spool configured to receive the veil cloth, and a plurality of textile needles located between the feeder spool and the take up spool, wherein the plurality of textile needles is moveable with respect to the housing between a retracted position and an extended position for moving through thickness fibers from the veil cloth to the fibrous preform.

In various embodiments, the feeder spool and the take up spool are mounted to, and configured to move together with, the housing.

In various embodiments, a remote creel house is provided for supplying the feeder spool with the veil cloth. In various embodiments, used veil cloth is directed from the take up spool back into the remote creel house.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
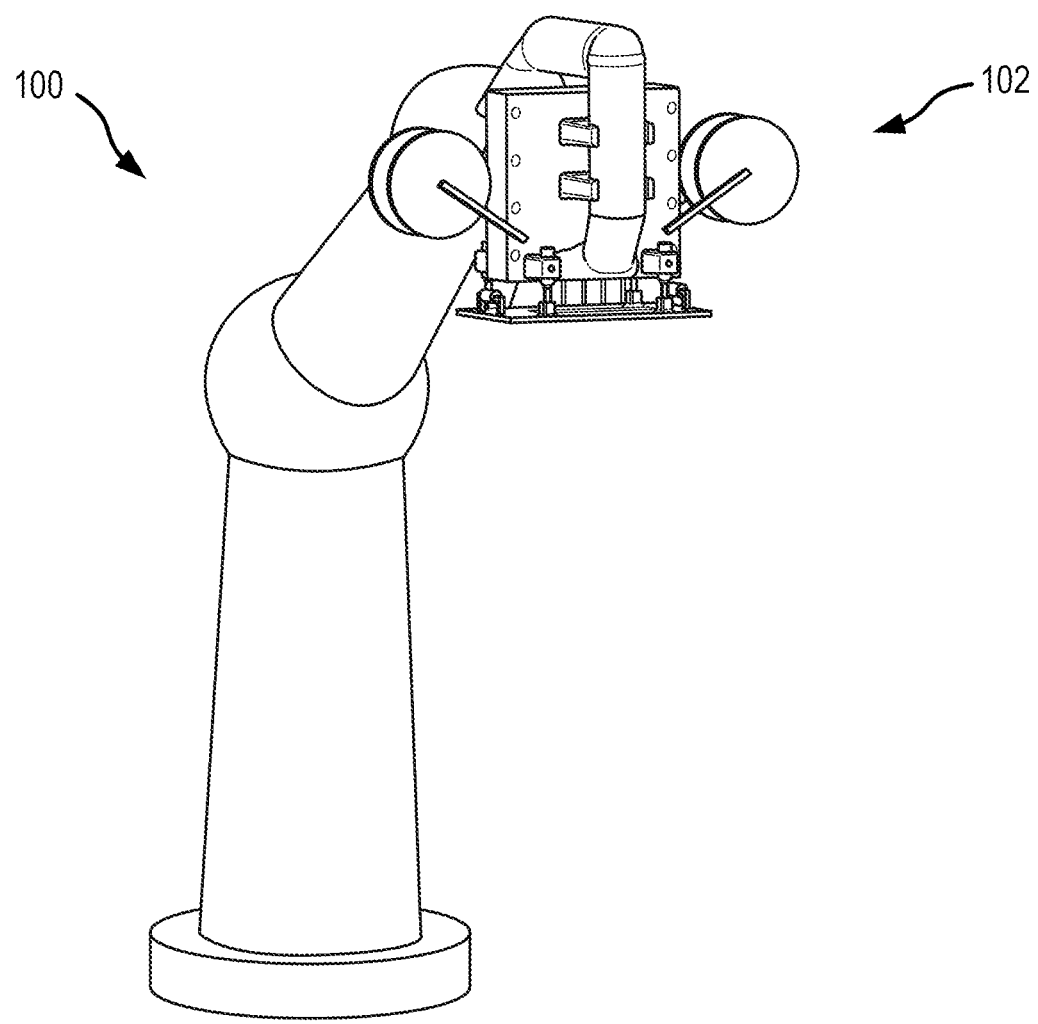
FIG. 1A is a perspective illustration of an exemplary robotic arm comprising a through thickness reinforcement apparatus, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Carbon-carbon composites having undergone through thickness reinforcement (sometimes referred to as 2.5D carbon-carbon composites) provide higher interlaminar properties but lower in-plane properties compared to 2D lay-ups (i.e., layups that have not undergone through thickness reinforcement). Some composite structures for aerospace applications have complex contours to meet aerodynamic and thermal requirements. Additionally, it is sometime desirable for the structures to withstand in-plane and interlaminar stresses, which may vary across the structure.

The present disclosure provides systems and methods for through thickness reinforcement of fibrous preforms. Through thickness reinforcement can include punching or penetrating the fibrous preform using textile needles. Textile needles may include small barbs to efficiently transport fibers in the through-thickness direction of the fibrous preform. In various embodiments, textile needles may include small eyes (in some cases in addition to small barbs) to transport a fiber filament in the through-thickness direction of the fibrous preform.

The present disclosure provides systems and methods to insert through thickness fibers (sometimes referred to as z-fibers) into a fiber ply-stack. In various embodiments, a non-direction sacrificial fiber veil cloth is unspooled from a feeder spool to align parallel to the fiber ply-stack. The veil cloth can be a continuous fiber mat, stretch broken fiber mat, woven fabrics, non-woven fabrics, etc. Fibers in the sacrificial mat/ply may be of a structural, fusible (e.g., high-char yield thermoplastic fibers), or fugitive type. A barbed, textile needle can then be inserted through the veil cloth where fibers are captured by the needle barbs. The textile needle can then continue to travel through the fiber ply-stack and carry the veil cloth z-fibers to the desired transport depth. The textile needle can then retract from the ply-stack and the veil cloth. The remaining veil cloth can be advanced onto a take up spool to allow for advancement of un-punched veil cloth into position below the needle. In this manner, the veil cloth is removed from the fiber ply-stack prior to the fiber ply-stack undergoing further processing (e.g., shape-forming, carbonization, densification, etc.).

According to various embodiments, a stripper plate can be disposed between the ply stack and veil cloth to assist with ensuring complete separation of the z-fiber from the veil cloth. The geometry of the stripper plate can be varied to change the contact force and pressure applied to the ply stack, clearance for the needles, lead in and lag out distances, or with incorporated rollers for continuous pressure as the needle head moves over the ply-stack. In various embodiments, a cutting blade can be included to separate the z-fibers from the veil cloth. The needle head may include a single needle or multiple needs organized in a variety of arrays. Systems and methods of the present disclosure can also be used in conjunction with automated fiber placement. A needle board and robotic arm could be integrated into a removable cartridge. The ribbon or fiber used to manufacture the preform can be changed in process as each ply is needled in place or laid up.

Systems and methods of the present disclosure, in various embodiments, tend to solve the issue of having a sacrificial ply as a parasitic in-plane material integrated into the structure. Remnant non-directional material can decrease the in-plane properties of the resultant component and result in fly-away material. In this regard, various embodiments of the present disclosure are geared towards producing composite preforms with through thickness reinforcement, but limited degradation in in-plane properties. Systems and methods of the present disclosure provide an efficient way of reinforcing the preform in the z-direction without residual parasitic material in-plane. Further, the present disclosure, in various embodiments, eliminates the need to apply a veil cloth after layup of in-plane fiber plies. Systems and methods of the present disclosure tend to enable higher strength structural composite components than those manufactured using legacy systems.

Figure 1B:
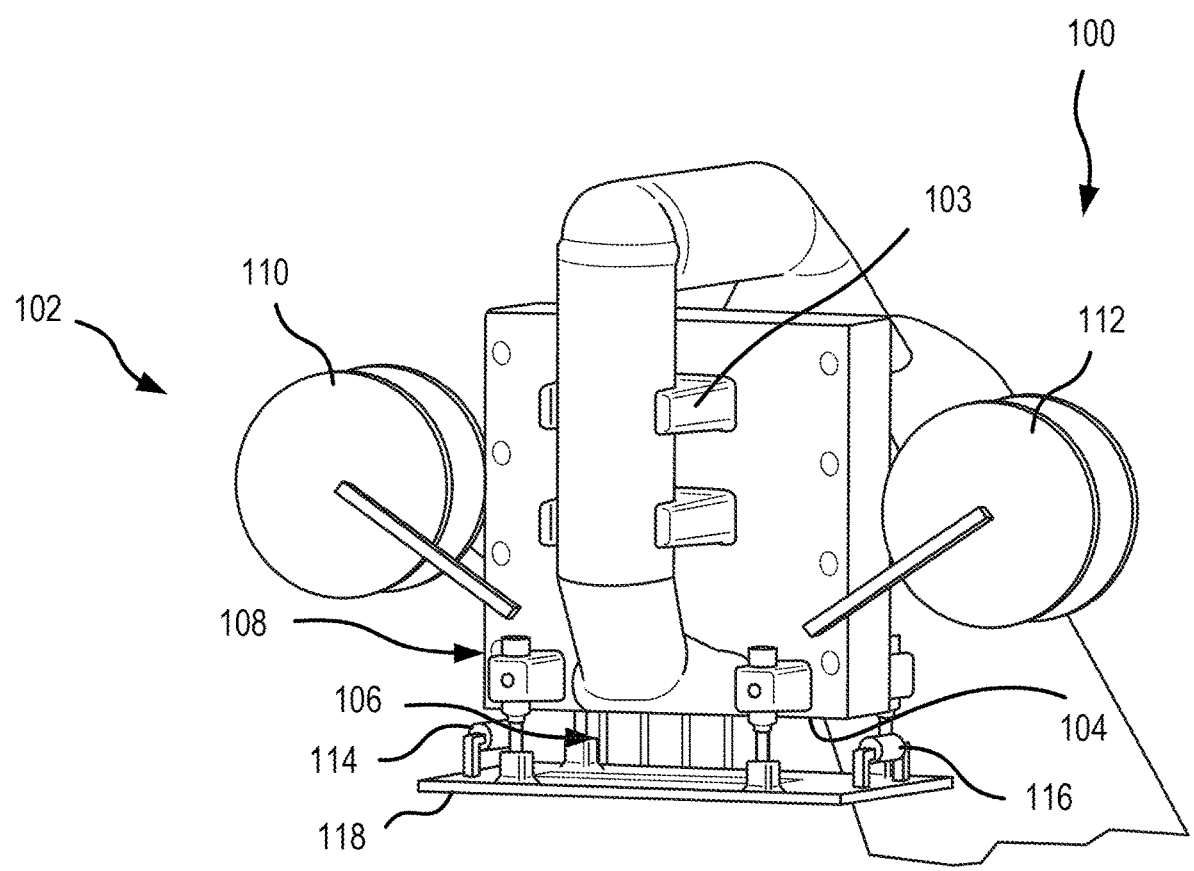
FIG. 1B is an enlarged perspective illustration of the through thickness reinforcement apparatus of FIG. 1A, in accordance with various embodiments.

With reference to FIG. 1A and FIG. 1B, a robotic arm 100 comprising a through thickness reinforcement apparatus 102 (also referred to herein as an apparatus) is illustrated, in accordance with various embodiments. Through thickness reinforcement apparatus 102 can be placed over a fibrous ply stack (also referred to herein as a fibrous preform) for performing through thickness reinforcement to the ply stack. Robotic arm 100 may be configured to move the apparatus 102 with respect to the fibrous preform in a controlled manner to perform through thickness reinforcement, such as Z-needling. Z-needling refers to a process comprising penetrating a composite material (e.g., the fibrous preform) with needles and moving (e.g., by pulling or pushing) fibers from the in-plane direction and forcing them into the Z direction, where the "Z direction" as used herein refers to a direction perpendicular to the in-plane direction. For preforms having curved surfaces, the "Z-direction" refers to the direction normal to a (local) surface of the fibrous preform at the point where the preform is being needled (i.e., a direction normal to the tangent plane to the surface at the point of needling). In general, the Z-needling process has the effect of interlocking individual fabric layers together. The same effect may also be achieved by stitching or tufting, known to those skilled in the art to comprise inserting a fiber filament into the through-thickness direction. Thus, after through thickness reinforcement, the fibrous material has fibers extending in three different directions (i.e., in the X and Y directions in the plane of the fibrous layers and the Z direction perpendicular to the fibrous layers). It should be appreciated that through thickness reinforcement, as used herein, includes moving through thickness fibers in a direction at an angle to the in-plane direction, such as 90° (i.e., the Z-direction); though through thickness fibers can be oriented at any non-zero angle with respect to the in-plane direction (e.g., at an angle of between 1° and 90° with respect to the in-plane direction).

Apparatus 102 includes an actuating needle board 104 comprising a plurality of textile needles 106. Textile needles 106 can be configured to move or translate with respect to a housing 108 for penetrating or punching into the fibrous preform. Housing 108 can include an attachment member 103 for coupling the housing 108 to robotic arm 100. Apparatus further includes a feeder spool 110 for supplying an un-needled veil cloth and a take up spool 112 for capturing the needled veil cloth after through thickness fibers have been moved from the veil cloth into the fibrous preform by the needles 106. In this manner, un-needled veil cloth can be actively fed to the needles 106 for through thickness reinforcement of the fibrous preform during a through thickness reinforcement process.

Apparatus 102 can further include a first roller 114 (also referred to herein as a first pressure roller or a first guide roller) and a second roller 116 (also referred to herein as a second pressure roller or a second guide roller) for guiding the veil cloth as the veil cloth is moved from feeder spool 110 onto take up spool 112. First roller 114 and second roller 116 can help secure the veil cloth with respect to the fibrous preform during through thickness reinforcement (i.e., while the needles 106 penetrate into the veil cloth and the fibrous preform). In various embodiments, first roller 114 and second roller 116 compress the veil cloth against the fibrous preform during through thickness reinforcement. First roller 114 and second roller 116 can guide the veil cloth as the veil cloth is being moved from feeder spool 110 onto take up spool 112. First roller 114 and second roller 116 can be configured to secure the veil cloth parallel to the fibrous preform.

In various embodiments, apparatus 102 further includes a presser foot 118. Presser foot 118 can help secure the veil cloth with respect to the fibrous preform during through thickness reinforcement (i.e., while the needles 106 penetrate into the veil cloth and the fibrous preform). In various embodiments, presser foot 118 compresses the veil cloth against the fibrous preform during through thickness reinforcement.

Figure 13:
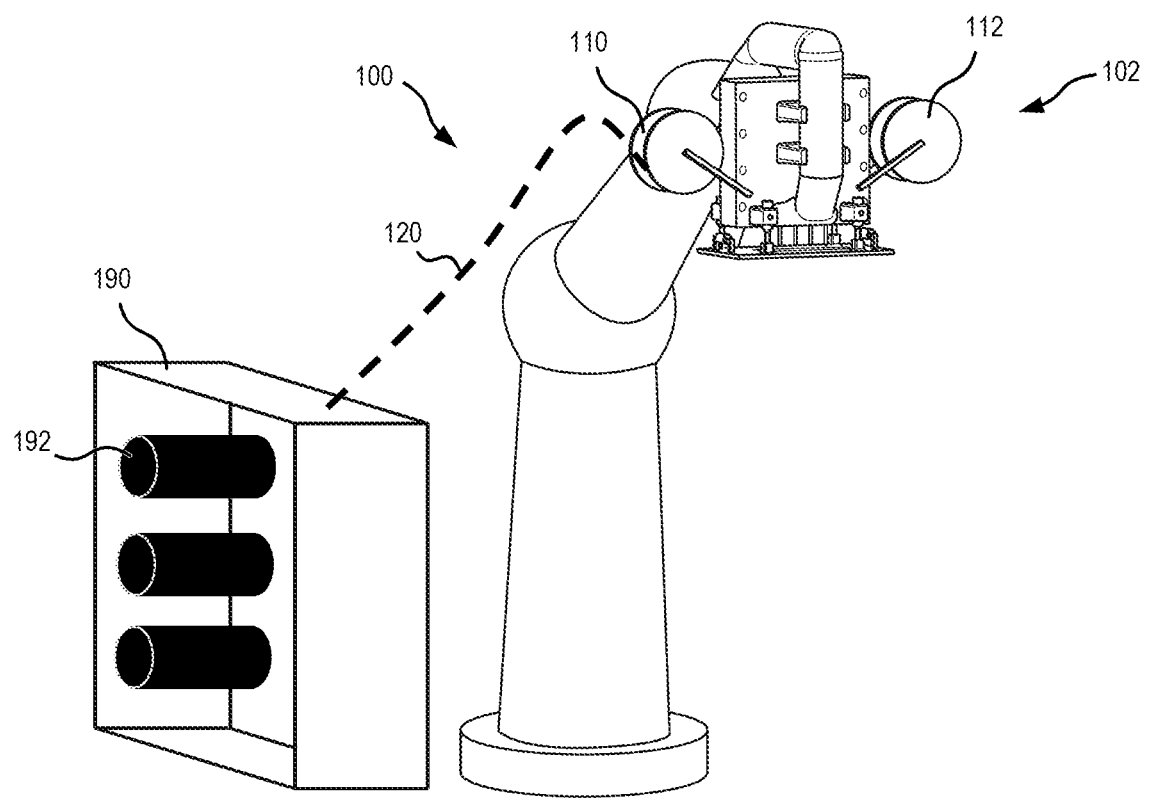
FIG. 13 is a perspective illustration of the robotic arm comprising the through thickness reinforcement apparatus of FIG. 1A operatively coupled to a creel house, in accordance with various embodiments.

With reference to FIG. 13, feeder spool 110 can be configured to receive the veil cloth from a creel house 190, in accordance with various embodiments. Creel house 190 can be spaced apart from the robotic arm 100 such that the apparatus 102 moves with respect to creel house 190 during normal operation; though in various embodiments, creel house 190 can be configured to move together with apparatus 102. In this regard, creel house 190 can be a remote creel house (i.e., not mounted directly to, and spaced apart from, apparatus 102). The creel house 190 can remain stationary during normal operation, in accordance with various embodiments. Creel house 190 can include one or more material spools 192 housed therein for supplying the apparatus 102 with at least the veil cloth. For example, veil cloth 120 can extend from creel house 190 to feeder spool 110. In various embodiments, used veil cloth can be fed from take up spool 112 back to creel house 190 if desired. In this regard, creel house 190 can include material spools 192 for supplying material, as well as material spools 192 for receiving used material.

Figure 2A:
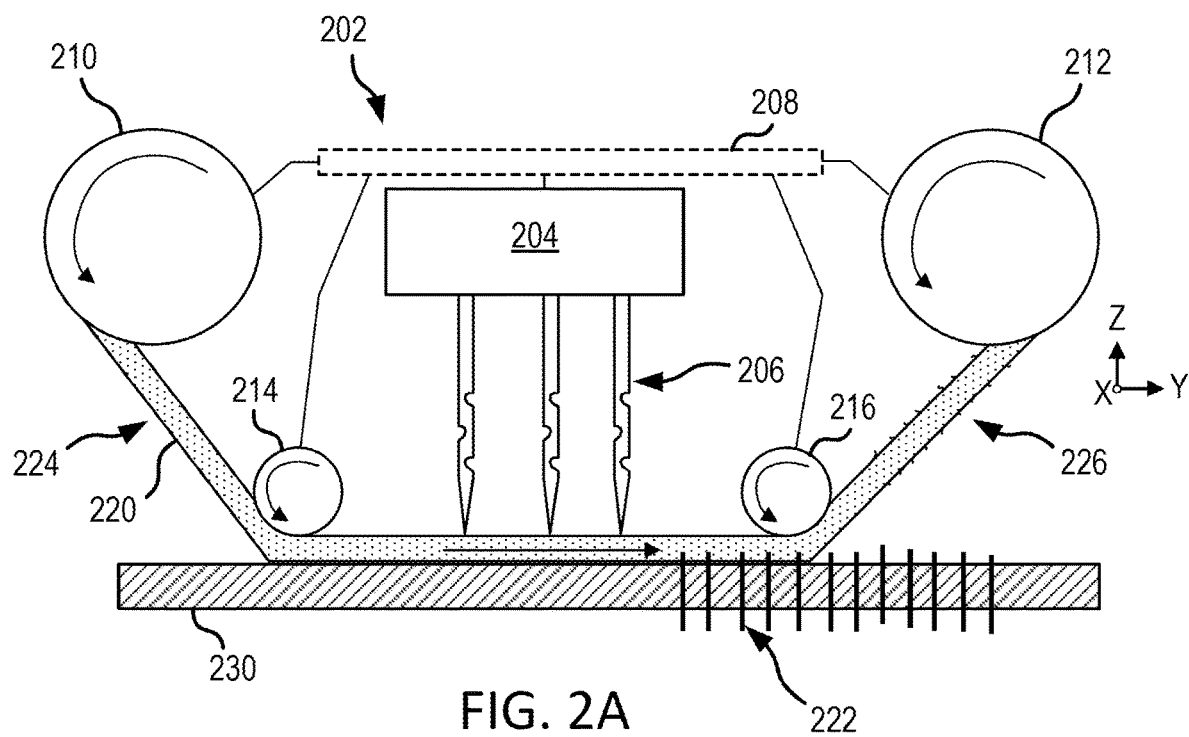
FIG. 2A and FIG. 2B are schematic illustrations of a through thickness reinforcement apparatus during a through thickness reinforcement process with an actuating needle board in a retracted position and an extended position, respectively, in accordance with various embodiments.
Figure 2B:
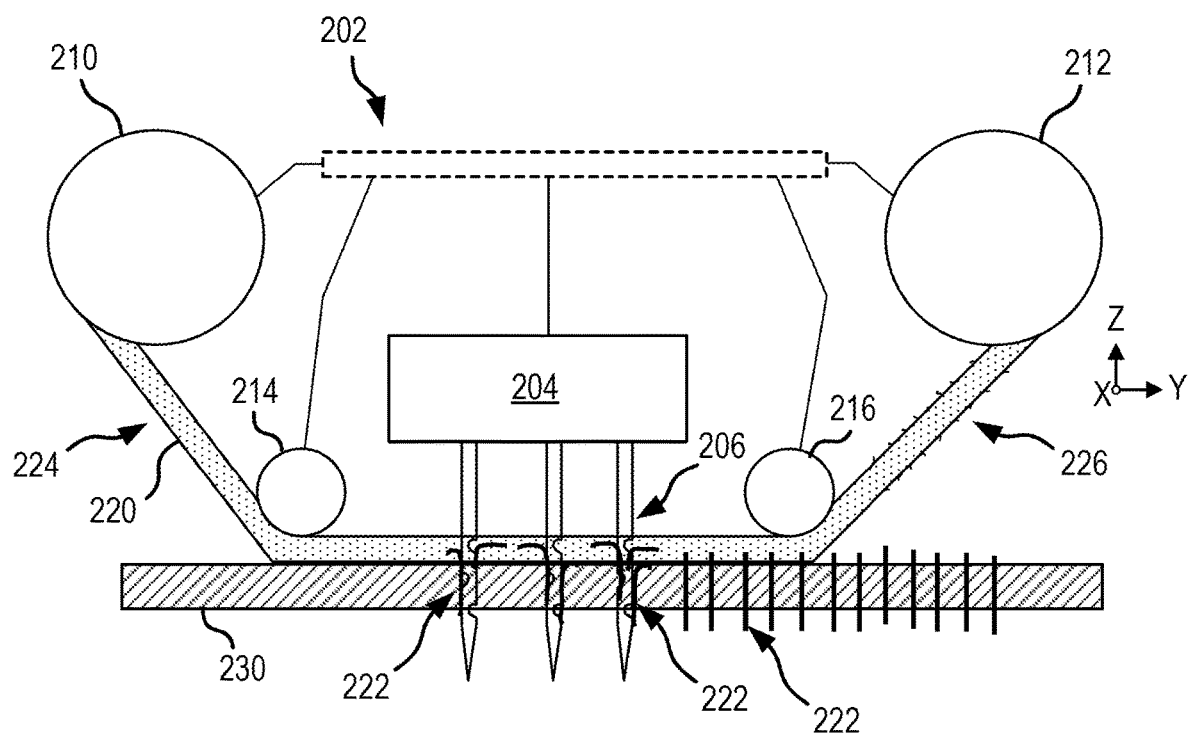

With reference to FIG. 2A and FIG. 2B, schematic views of a through thickness reinforcement apparatus 202 are illustrated, in accordance with various embodiments. In various embodiments, apparatus 202 is similar to apparatus 102 as described with respect to FIG. 1A and FIG. 1B. Apparatus 202 includes an actuating needle board 204 comprising a plurality of textile needles 206. Textile needles 206 can be configured to move or translate with respect to a housing 208 for penetrating or punching into a fibrous preform 230. Fibrous preform 230 may comprise a plurality of plies or layers. Each layer of material may share a common (e.g., the same) construction and/or material makeup. Each layer of material, for example, may be formed by a sheet/layer of fibrous material; e.g., woven carbon fiber, woven oxidized polyacrylonitrile (PAN) fibers, non-crimp fabric, etc. One or more or all the layers of material may each be impregnated with a polymer matrix; e.g., thermoset material or thermoplastic material. One or more or all the layers of material may each be unimpregnated (e.g., only include the fibrous material) where, for example, the preform material is impregnated subsequent to formation of the composite structure. The method of the present disclosure, however, is not limited to such exemplary layer materials.

Apparatus 202 further includes a feeder spool 210 for supplying an un-needled veil cloth 220 and a take up spool 212 for capturing the needled veil cloth 220 after through thickness fibers 222 have been moved from the veil cloth 220 into the fibrous preform 230 by the needles 206. In this manner, an un-needled veil cloth portion 224 of veil cloth 220 can be actively fed to the needles 206 for through thickness reinforcement of the fibrous preform 230 during a through thickness reinforcement process. At the same time, a needled veil cloth portion 226 can be taken up away from the fibrous preform 230 onto the take up spool 212.

Apparatus 202 can further include a first roller 214 (also referred to herein as a first pressure roller or a first guide roller) and a second roller 216 (also referred to herein as a second pressure roller or a second guide roller) for guiding the veil cloth 220 as the veil cloth 220 is moved from feeder spool 210 onto take up spool 212. First roller 214 and second roller 216 can help secure the veil cloth 220 with respect to the fibrous preform 230 during through thickness reinforcement (i.e., while the needles 206 penetrate into the veil cloth 220 and the fibrous preform 230). In various embodiments, first roller 214 and second roller 216 compress the veil cloth 220 against the fibrous preform 230 during through thickness reinforcement. First roller 214 and second roller 216 can guide the veil cloth 220 as the veil cloth 220 is being moved from feeder spool 210 onto take up spool 212. First roller 214 and second roller 216 can be configured to secure the veil cloth 220 parallel to the fibrous preform 230. In this manner, needles 206 can penetrate veil cloth 220 and carry through thickness fibers 222 from the veil cloth 220 directly into fibrous preform 230, in accordance with various embodiments. Stated differently, veil cloth 220 can directly contact fibrous preform 230 during through thickness reinforcement using apparatus 202, in accordance with various embodiments.

It should be understood that the housing 208 is schematically illustrated in FIG. 2A and FIG. 2B for ease of illustration. Connections (i.e., connecting lines) are shown between the housing 208 and various components (i.e., needle board 204, feeder spool 210, take up spool 212, first roller 214, and second roller 216). In this regard, needle board 204, feeder spool 210, take up spool 212, first roller 214, and/or second roller 216 can be mounted to housing 208 via various connections. In various embodiments, first roller 214 and/or second roller 216 are spring biased for compressing veil cloth 220 against fibrous preform 230. In this manner, apparatus 202 can be formed as a multi-component assembly operable as a single unit. In this manner, components of apparatus 202 described herein can move together with respect to the fibrous preform 230. Needle board 204 can move independently with respect to housing 208, feeder spool 210, take up spool 212, first roller 214, and second roller 216 during the needling operation. Needle board 204 and needles 206 can be located between feeder spool 210 and take up spool 212.

In various embodiments, first roller 214 is configured to guide veil cloth 220 from feeder spool 210 to second roller 216 (e.g., between needling operations) to supply the needles 206 with an un-needled portion 224 of the veil cloth 220. Second roller can be configured to simultaneously guide veil cloth 220 from first roller 214 to take up spool 212 to remove the needled portion 226 of veil cloth 220 from fibrous preform 230. In this manner, feeder spool 210, take up spool 212, first roller 214, and second roller 216 may simultaneously spin to move the veil cloth 220 with respect to the needles 206 between needle punch operations. In various embodiments, feeder spool 210 and/or take up spool 212 are spun using electric motors or any other suitable electromechanical device or the like. In various embodiments, rotation of feeder spool 210 and take up spool 212 is synchronized so as to maintain tension in veil cloth 220 during through thickness reinforcement.

In various embodiments, actuating needle board 204 is configured to move with respect to the first roller 214 and the second roller 216 between a retracted position (see FIG. 2A) and an extended position (see FIG. 2B) for moving through thickness fibers 222 from the veil cloth 220 to fibrous preform 230. In this manner, actuating needle board 204 can be provided with an actuator or any other suitable electromechanical, pneumatic, or hydraulic device, or the like.

In various embodiments, veil cloth 220 comprises oxidized PAN fibers. In various embodiments, veil cloth 220 comprises carbon fibers. In various embodiments, fibrous preform 230 comprises oxidized PAN fibers. In various embodiments, fibrous preform 230 comprises carbon fibers. In various embodiments, fibrous preform 230 comprises oxidized PAN fibers and veil cloth 220 comprises oxidized PAN fibers. In various embodiments, fibrous preform 230 comprises carbon fibers and veil cloth 220 comprises oxidized PAN fibers; though in various embodiments, both fibrous preform 230 and veil cloth 220 comprise carbon fibers.

Figure 3A:
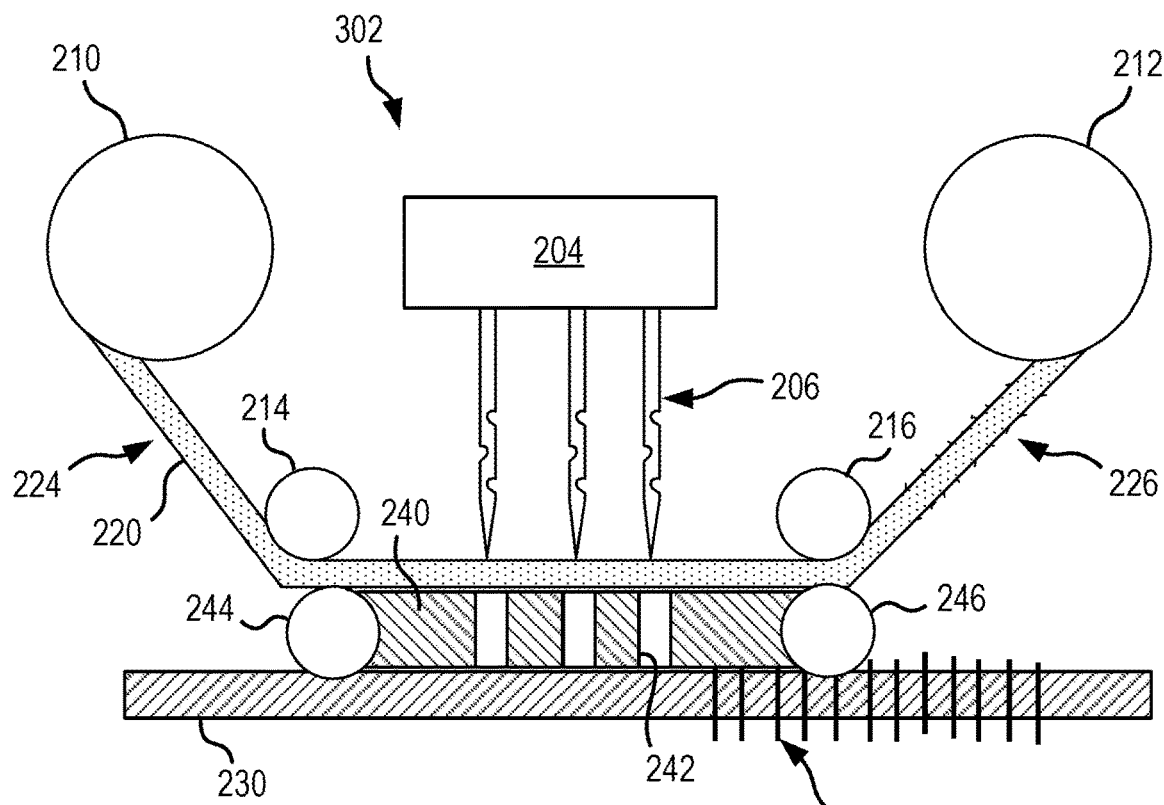
FIG. 3A and FIG. 3B are schematic illustrations of a through thickness reinforcement apparatus during a through thickness reinforcement process with an actuating needle board in a retracted position and an extended position, respectively, and including a stripper plate, in accordance with various embodiments.
Figure 3B:
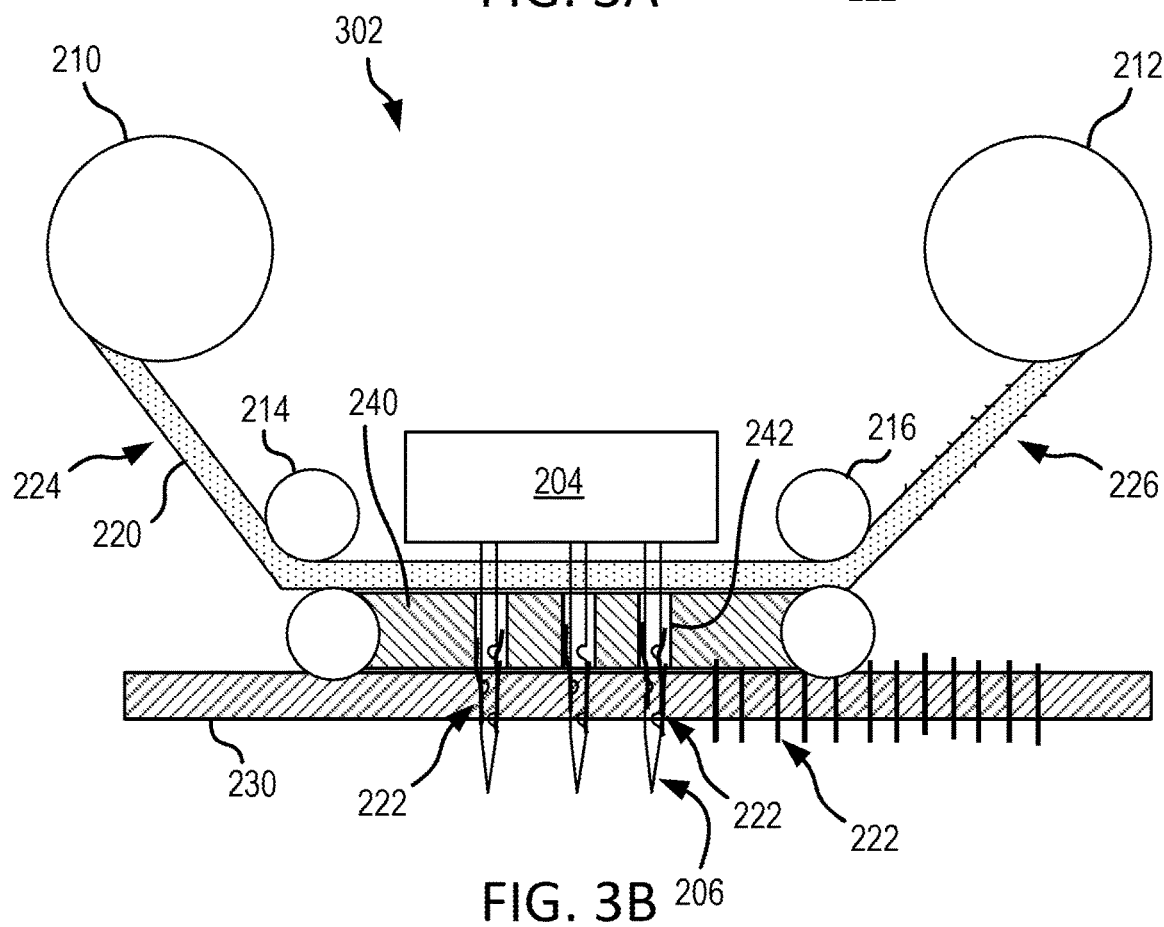

With reference to FIG. 3A and FIG. 3B, schematic views of a through thickness reinforcement apparatus 302 are illustrated, in accordance with various embodiments. In various embodiments, apparatus 302 is similar to apparatus 202 as described with respect to FIG. 2A and FIG. 2B, except that apparatus 302 further includes a stripper plate 240 disposed between veil cloth 220 and fibrous preform 230. In FIG. 3A and FIG. 3B, housing 208 is omitted for ease of illustration; though it should be understood that the components illustrated in FIG. 3A and FIG. 3B can be mounted to a common housing (e.g., housing 208). With respect to FIG. 3A and FIG. 3B, elements with like element numbering, as depicted in FIG. 2A and FIG. 2B, are intended to be the same and will not necessarily be repeated for the sake of clarity.

In various embodiments, stripper plate 240 can aid in enabling complete through thickness fiber 222 separation from veil cloth 220 prior to and/or during insertion into fibrous preform 230. Stated differently, stripper plate 240 can be configured to space apart the veil cloth 220 from the fibrous preform 230 to aid in separation of the through thickness fiber 222 from the veil cloth 220 prior to insertion of the through thickness fiber 222 into the fibrous preform 230. In this manner, the thickness of the stripper plate 240 can be chosen based on a length of the fibers found in the veil cloth 220, in accordance with various embodiments.

Stripper plate 240 may comprising a plurality of apertures 242, each for receiving a respective needle 206 therethrough. In this manner, stripper plate 240 can compress the fibrous preform 230 while accommodating needles 206 during the needling operation. In various embodiments, a first roller 244 (also referred to herein as a first pressure roller) and a second roller 246 (also referred to herein as a second pressure roller) can be mounted to the stripper plate 240 for compressing fibrous preform 230 and/or for compressing veil cloth 220 between first and second rollers 214, 216 and first and second rollers 244, 246, respectively. Stripper plate 240 can be oriented parallel to veil cloth 220 and fibrous preform 230.

Figure 4:
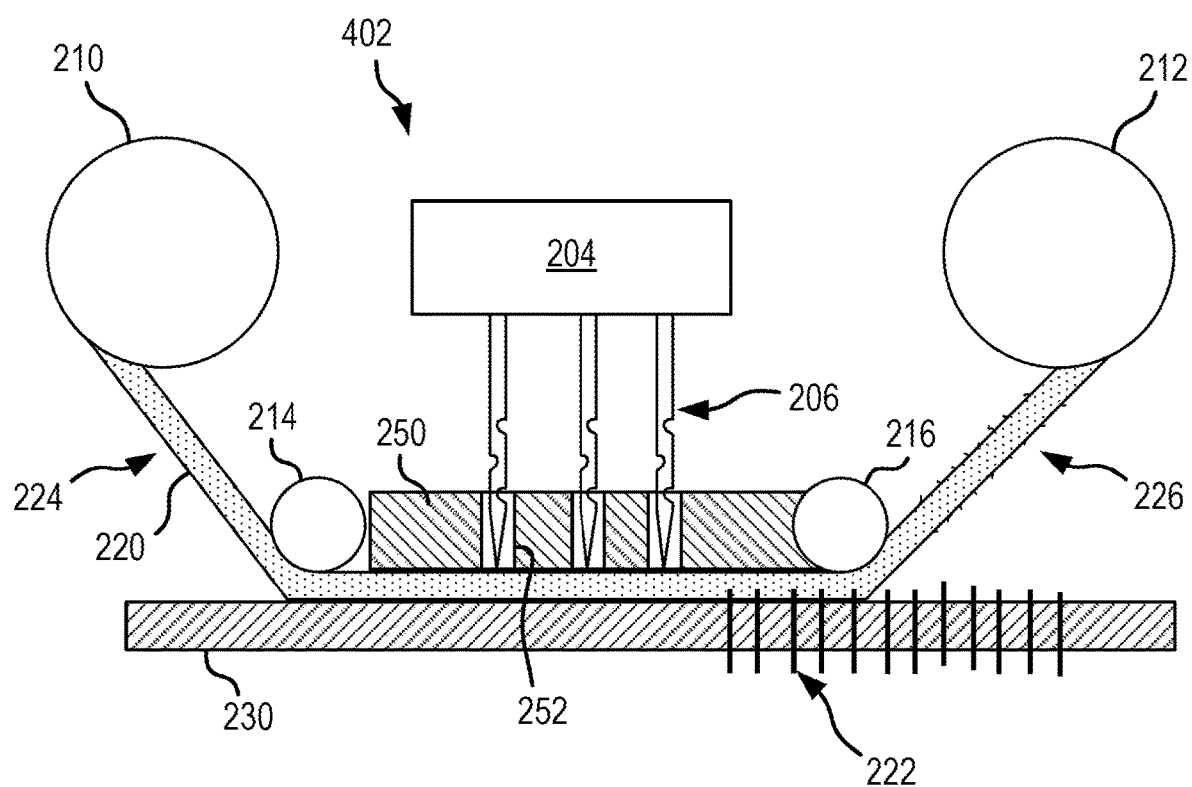
FIG. 4 is a schematic illustration of a through thickness reinforcement apparatus with an actuating needle board in a retracted position and including a stripper plate, in accordance with various embodiments.

With reference to FIG. 4, a schematic view of a through thickness reinforcement apparatus 402 is illustrated, in accordance with various embodiments. In various embodiments, apparatus 402 is similar to apparatus 302 as described with respect to FIG. 3A and FIG. 3B, except that a stripper plate 250 is disposed over veil cloth 220. In FIG. 4, housing 208 (see FIG. 2A) is omitted for ease of illustration; though it should be understood that the components illustrated in FIG. 4 can be mounted to a common housing (e.g., housing 208). With respect to FIG. 4A and FIG. 4B, elements with like element numbering, as depicted in FIG. 2A and FIG. 2B, are intended to be the same and will not necessarily be repeated for the sake of clarity.

In various embodiments, stripper plate 250 can aid in enabling even compaction of the veil cloth 220 and fibrous preform 230 to ensure maximum transport of through thickness fibers 222 from veil cloth 220 to fibrous preform 230.

Figure 5:
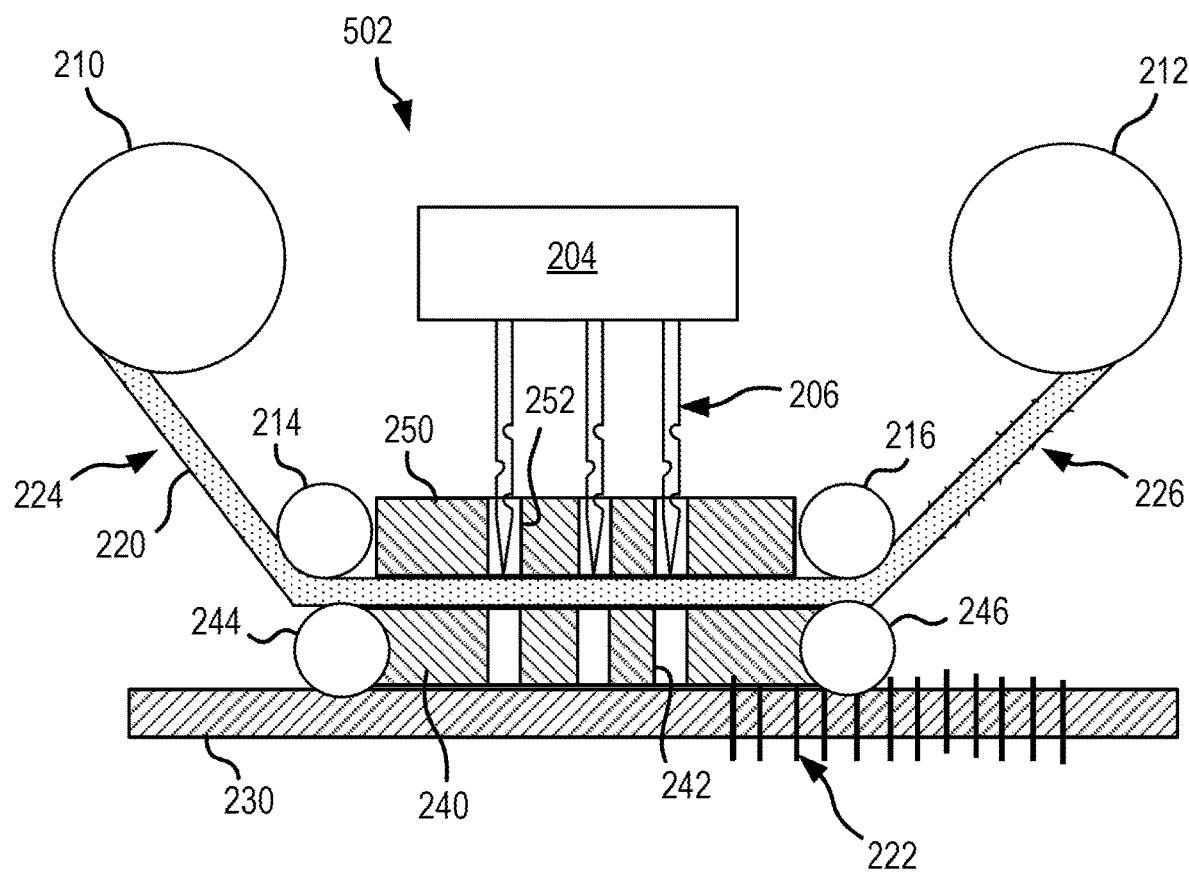
FIG. 5 is a schematic illustration of a through thickness reinforcement apparatus with an actuating needle board in a retracted position and including a first stripper plate and a second stripper plate, in accordance with various embodiments.

With reference to FIG. 5, a schematic view of a through thickness reinforcement apparatus 502 is illustrated, in accordance with various embodiments. In various embodiments, apparatus 502 is a combination of apparatus 302 as described with respect to FIG. 3A and FIG. 3B and apparatus 402 as described with respect to FIG. 4A and FIG. 4B in that apparatus 502 includes both stripper plate 240 and stripper plate 250. In FIG. 5, housing 208 (see FIG. 2A) is omitted for ease of illustration; though it should be understood that the components illustrated in FIG. 5 can be mounted to a common housing (e.g., housing 208). With respect to FIG. 5, elements with like element numbering, as depicted in FIG. 3A and FIG. 4, are intended to be the same and will not necessarily be repeated for the sake of clarity.

Figure 6:
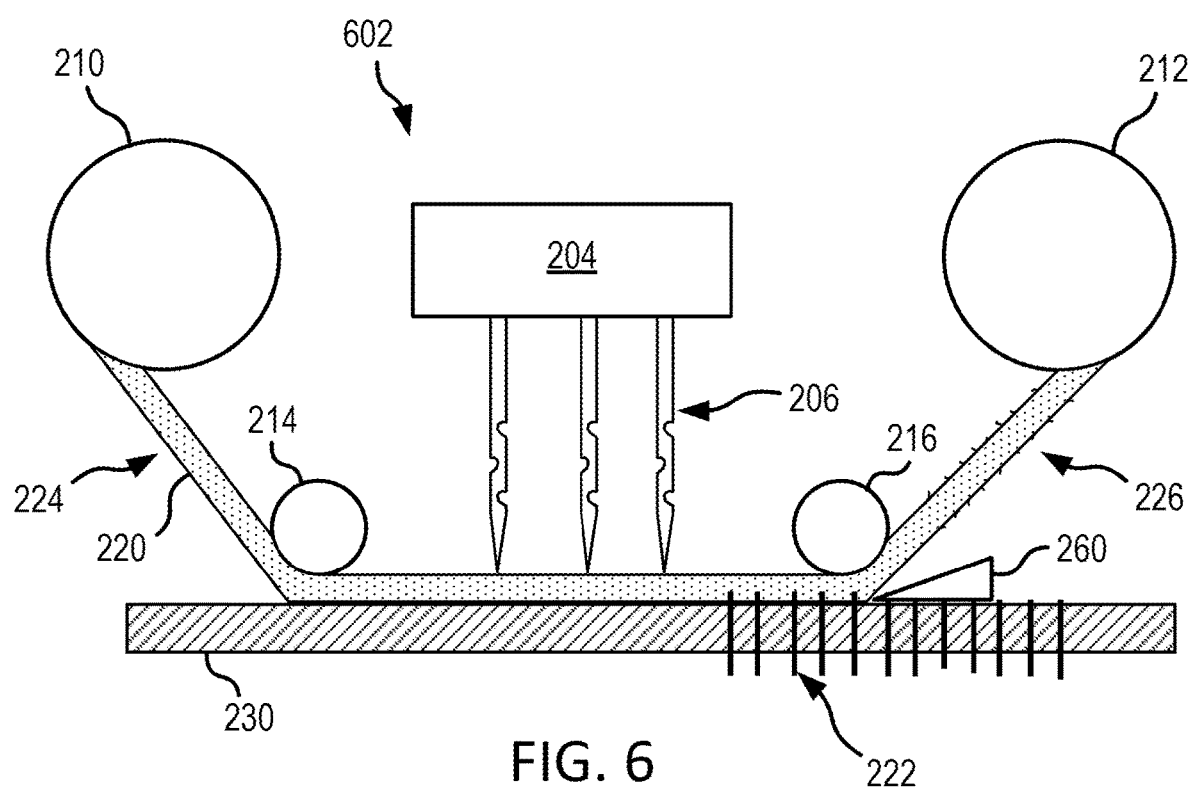
FIG. 6 is a schematic illustration of a through thickness reinforcement apparatus with an actuating needle board in a retracted position and including a cutting blade, in accordance with various embodiments.

With reference to FIG. 6, a schematic view of a through thickness reinforcement apparatus 602 is illustrated, in accordance with various embodiments. In various embodiments, apparatus 602 is similar to apparatus 202 as described with respect to FIG. 2A and FIG. 2B except that apparatus 602 further includes a cutting blade 260 for separating through thickness fibers 222 from veil cloth 220. In FIG. 6, housing 208 (see FIG. 2A) is omitted for ease of illustration; though it should be understood that the components illustrated in FIG. 6 can be mounted to a common housing (e.g., housing 208). With respect to FIG. 6, elements with like element numbering, as depicted in FIG. 2A, are intended to be the same and will not necessarily be repeated for the sake of clarity.

In various embodiments, cutting blade 260 is configured to cut the through thickness fibers 222 extending between and to veil cloth 220 and fibrous preform 230 as the veil cloth 220 is lifted from fibrous preform 230. Cutting blade 260 can prevent inserted through thickness fibers 222 from being pulled from fibrous preform 230. In this regard, cutting blade 260 can be located between second roller 216 and fibrous preform 230. Cutting blade 260 is located between veil cloth 220 and fibrous preform 230. Cutting blade 260 may comprise a vibrating cutting blade 260, such as an ultrasonic cutting blade or the like.

Figure 7:
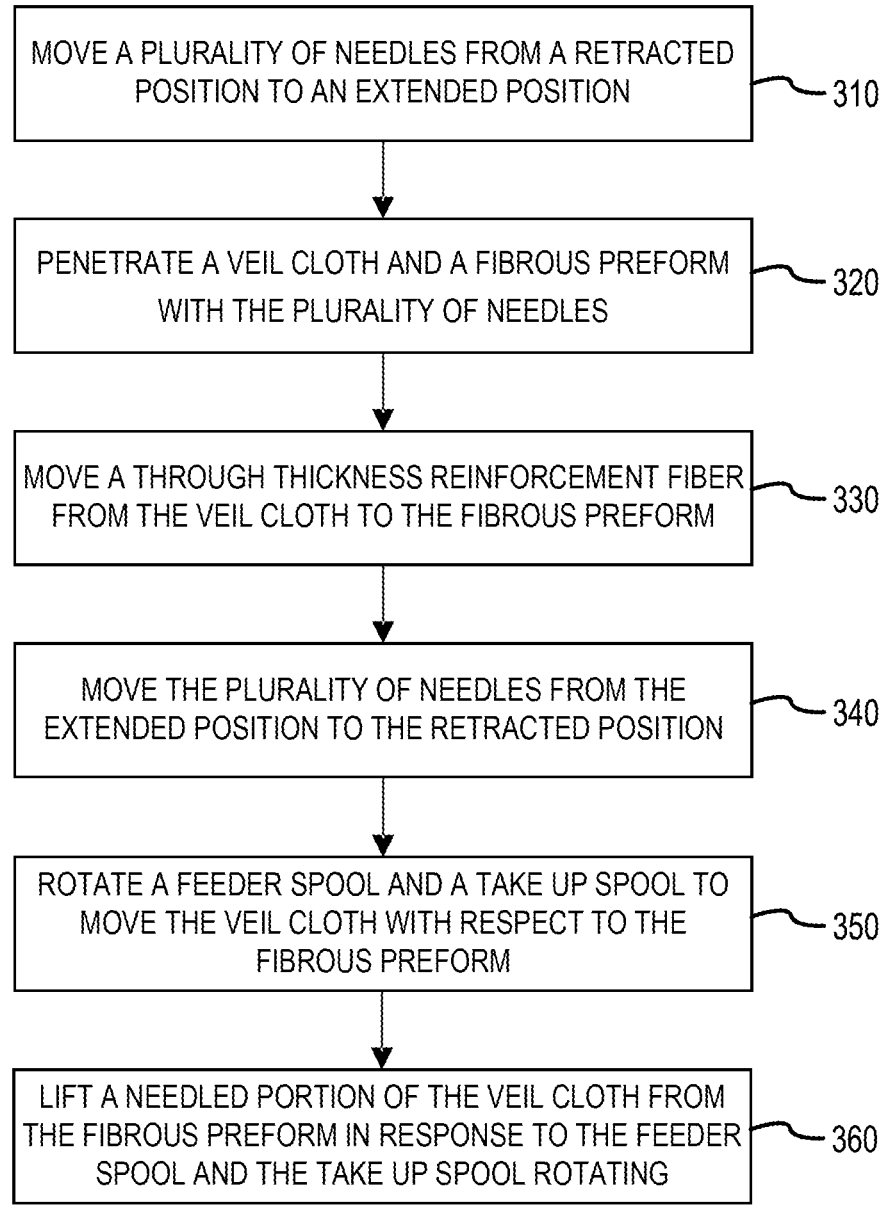
FIG. 7 is a flow chart of a method for performing a through thickness reinforcement process on a fibrous preform, in accordance with various embodiments.

With reference to FIG. 7, a method 300 for through thickness reinforcement is provided, in accordance with various embodiments. For case of description, the method 300 is described with reference to FIG. 2A and FIG. 2B; though method 300 is not limited in this regard. With combined reference to FIG. 2A and FIG. 7, method 300 includes moving a plurality of needles 206 from a retracted position (see FIG. 2A) to an extended position (see FIG. 2B) with respect to housing 208 (step 310). Method 300 includes penetrating veil cloth 220 and fibrous preform 230 with the plurality of needles 206 (see FIG. 2B) (step 320). Method 300 includes moving a through thickness fiber 222 from veil cloth 220 at least partially into the fibrous preform 230 in response to the fibrous preform 230 being penetrated with the plurality of needles 206 (step 330). Method 300 includes moving the plurality of needles 206 from the extended position to the retracted position (step 340). Step 340 can be performed after step 330 and before step 350. Method 300 includes rotating feeder spool 210 and take up spool 212 to move the veil cloth 220 with respect to the fibrous preform 230 (step 350). Step 350 can be performed using an electric motor or any other suitable apparatus for rotating the feeder spool 210 and/or the take up spool 212. Method 300 includes lifting a needled portion 226 of the veil cloth 220 from the fibrous preform 230 in response to the feeder spool 210 and the take up spool 212 rotating.

Figure 8A:
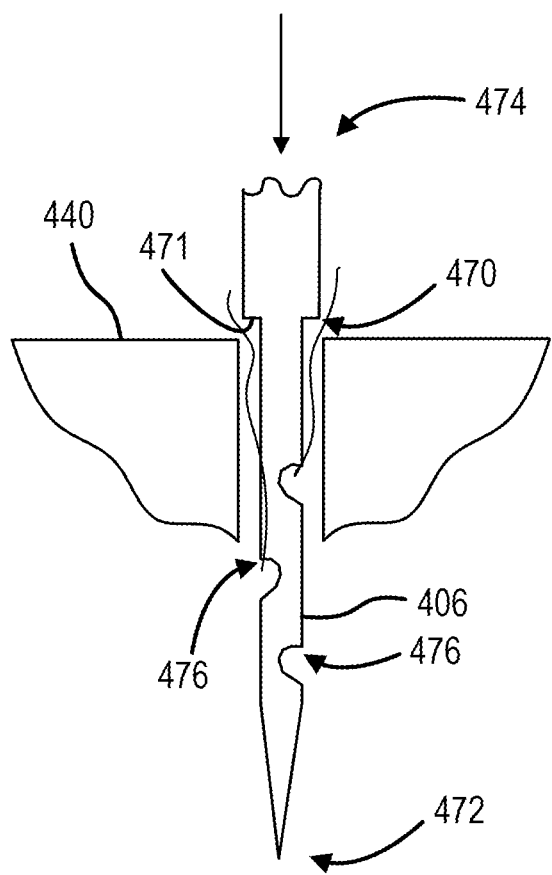
FIG. 8A and FIG. 8B are schematic illustrations of a stepped needle translating through a stripper plate, in accordance with various embodiments.
Figure 8B:
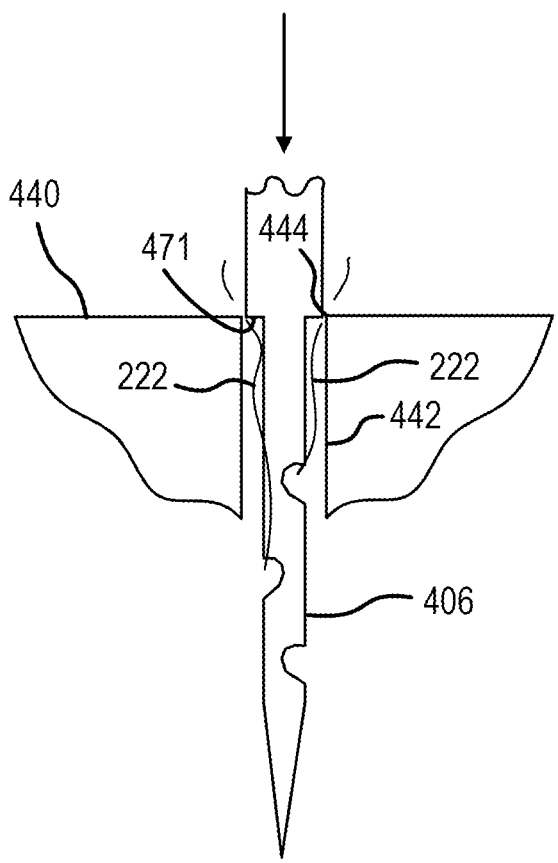

With reference to FIG. 8A and FIG. 8B, a needle 406 is illustrated with a stepped portion 470, in accordance with various embodiments. Stepped portion 470 may be located between a tip end 472 and a base end 474 of the needle. In various embodiments, barbs 476 are located between the tip end 472 and the stepped portion 470. The stepped portion 470 defines a step 471 in the needle 406 which can be configured to cut the through thickness fiber 222 as the needle 406 translates through the stripper plate 440. More particularly, as the needle 406 translates through the stripper plate 440, the through thickness fiber 222 can be pinched between step 471 and a leading edge 444 of the aperture 442 thereby cutting the through thickness fiber 222 and separating the through thickness fiber 222 from the veil cloth (e.g., see veil cloth 220 of FIG. 3B).

Figures 9A, 9B:
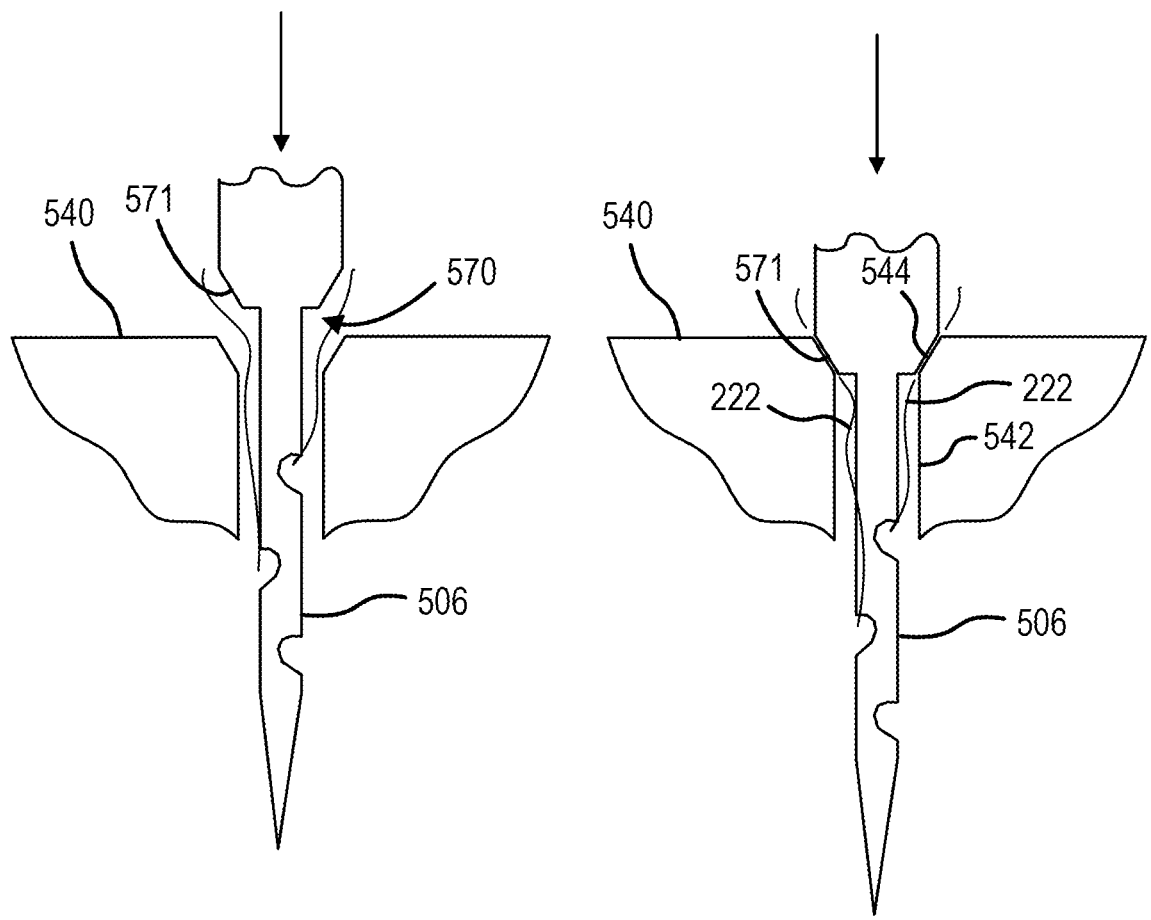
FIG. 9A and FIG. 9B are schematic illustrations of a tapered needle translating through a stripper plate, in accordance with various embodiments.
Figure 10:
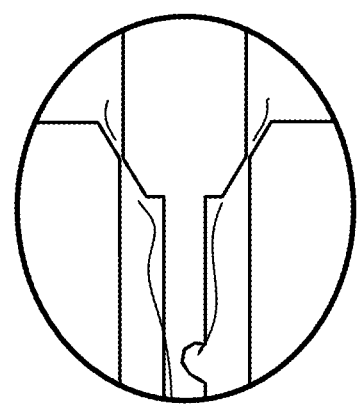
FIG. 10 is a schematic illustration of a tapered needle having a diameter which is less than the aperture of the stripper plate, in accordance with various embodiments.

With reference to FIG. 9A and FIG. 9B, a needle 506 is illustrated with a tapered portion 570, in accordance with various embodiments. The needle 506 and stripper plate 540 of FIG. 9A and FIG. 9B can be similar to the needle 406 and stripper plate 440 of FIG. 8A and FIG. 8B, except that the needle 506 is tapered instead of having a step. Moreover, the stripper plate 540 comprises a taper or chamfer 544 that is complimentary to the taper 571 of tapered portion 570 of the needle 506. The tapered portion 570 defines a taper 571 in the needle 506 which can be configured to cut the through thickness fiber 222 as the needle 506 translates through the stripper plate 540. More particularly, as the needle 506 translates through the stripper plate 540, the through thickness fiber 222 can be pinched between taper 571 and the chamfer 544 of the aperture 542 thereby cutting the through thickness fiber 222 and separating the through thickness fiber 222 from the veil cloth (e.g., see veil cloth 220 of FIG. 3B). In various embodiments, the maximum diameter of the needle 506 is greater than the diameter of the aperture 542. For example, the chamfer 544 can contact taper 571 to stop further translation of needle 506 with respect to stripper plate 540. In various embodiments, the maximum diameter of the needle 506 is slightly less than the diameter of the aperture 542, for example as illustrated in FIG. 10. For example, the chamfer 544 and taper 571 can act as a self-centering feature to facilitate translation of needle 506 with respect to stripper plate 540. In this regard, taper 571 of needle 506 can be configured to translate at least partially past the chamfer 544 of the stripper plate 540.

Figure 11:
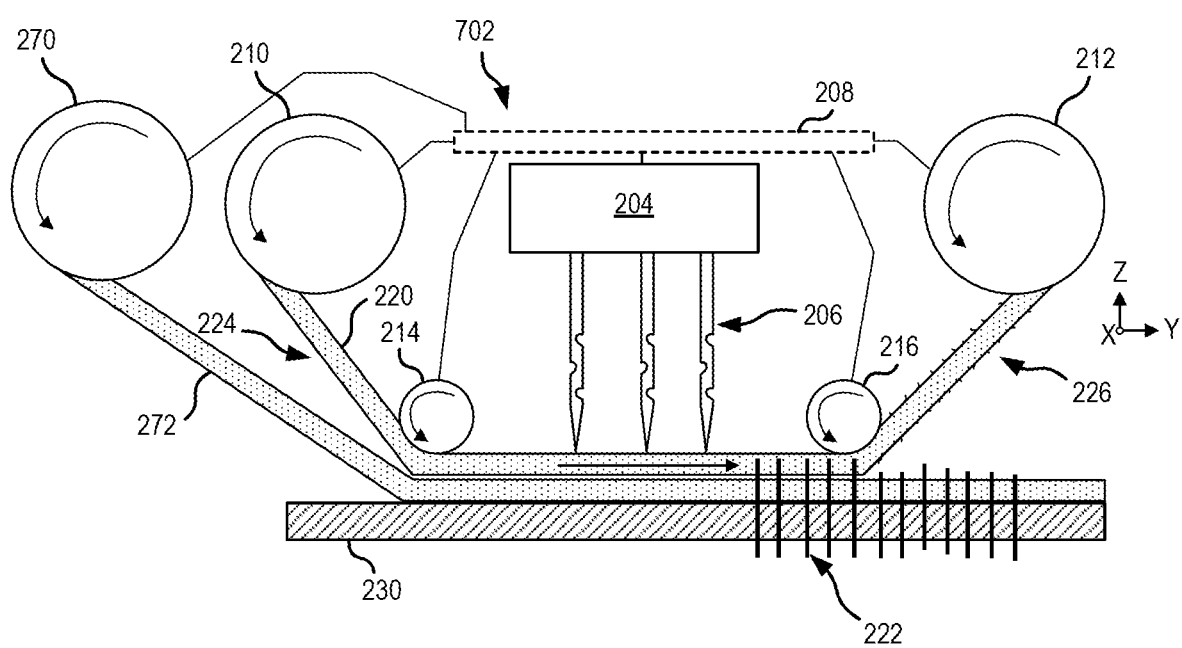
FIG. 11 is a schematic illustration of a through thickness reinforcement apparatus with a fiber tape placement feed, in accordance with various embodiments.

With reference to FIG. 11, a schematic view of a through thickness reinforcement apparatus 702 is illustrated, in accordance with various embodiments. In various embodiments, apparatus 702 is similar to apparatus 202 as described with respect to FIG. 2A and FIG. 2B, except that apparatus 702 further includes a fiber tape feed out roller 270 configured to supply a fiber tape 272 for through thickness reinforcement between veil cloth 220 and fibrous preform 230. Fiber tape feed out roller 270 can be mounted to housing 208 in accordance with various embodiments. With respect to FIG. 11, elements with like element numbering, as depicted in FIG. 2A and FIG. 2B, are intended to be the same and will not necessarily be repeated for the sake of clarity.

Fiber tape 272 comprises a carbon fiber tape or an oxidized PAN fiber tape, in accordance with various embodiments. In various embodiments, fiber tape 272 and fibrous preform 230 comprise the same type of material; though in various embodiments, the material of fiber tape 272 and fibrous preform 230 can differ. Fiber tape 272 can be a generally narrow strip of fibrous tape comprising a width of between one eighth inch and four inches (0.3175 cm-10.16 cm) in various embodiments, and a width of between one eighth inch and four inches (0.3175 cm-5.0816 cm) in various embodiments. The width of fiber tape 272 can be about one eight inch (0.3175 cm), about one quarter inch (0.635 cm), about one inch (2.54 cm), and/or about 2 inches (5.08 cm), in accordance with various embodiments, wherein the term "about" in this context can only mean±5%. In this regard, apparatus 702 may be particularly useful for laying up fiber tape 272 at locations where additional thickness is desired, at locations of compound curvatures, and/or other locations where it is desirable to lay up relatively narrow strips of fiber tape. Fiber tape 272 can be laid up on fibrous preform using an automated fiber placement (AFP) process. In this regard, fiber tape 272 can be supplied using fiber tape feed out roller 270 during the through thickness reinforcement process. In various embodiments, the fiber tape 272 unrolls from fiber tape feed out roller 270 as the robotic head (e.g., housing 208) moves with respect to fibrous preform 230, for example from right to left in FIG. 11. Stated differently, fiber tape 272 can be pulled from fiber tape feed out roller 270. In various embodiments, fiber tape feed out roller 270 may be configured to apply tension to fiber tape 272 (e.g., via friction resistance, via spring bias, via an electric motor, etc.).

In various embodiments, the unneedled portion 224 of veil cloth 220 and an unneedled portion of fiber tape 272 can be compressed between first roller 214 and fibrous preform 230. In this regard, first roller 214 can be spring biased, in accordance with various embodiments. Unlike veil cloth 220, fiber tape 272 remains on the fibrous preform 230 (e.g., as an additional layer of fibrous preform 230) after through thickness reinforcement using needles 206. In this regard, fiber tape 272 can be further processed (e.g., densification, carbonization, etc.) together with fibrous preform 230. In various embodiments, needling fiber tape 272 with fibrous preform 230 aids in securing the fiber tape 272 to fibrous preform 230.

Figure 12:
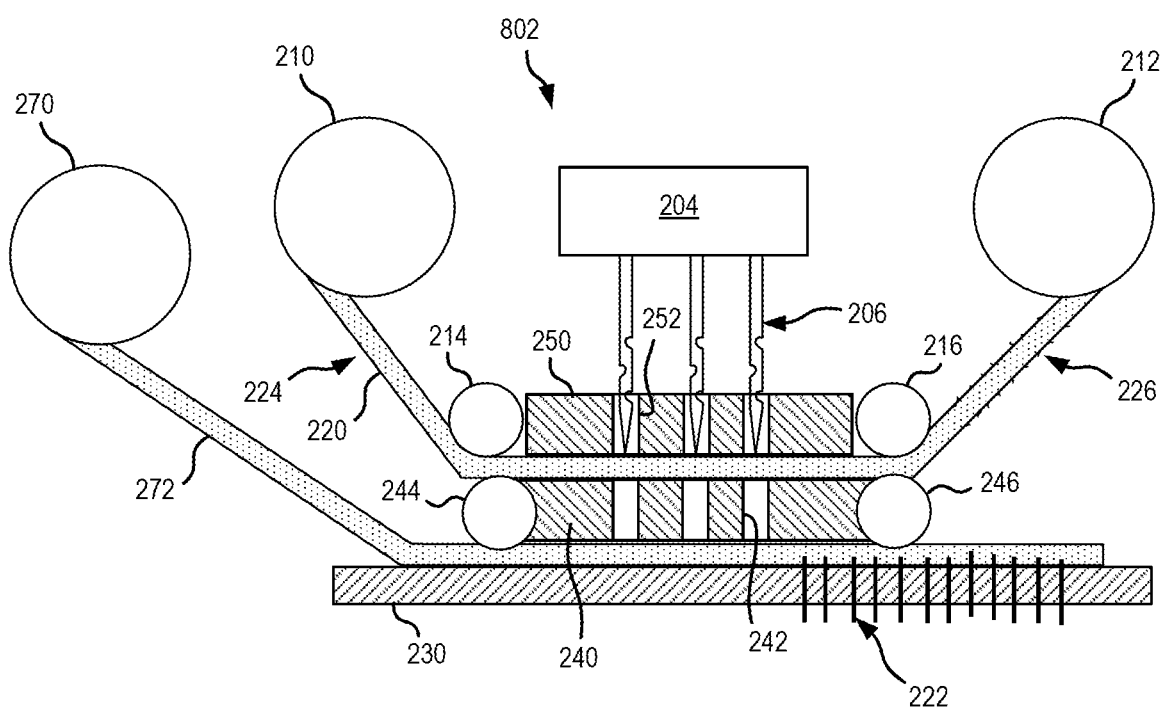
FIG. 12 is a schematic illustration of a through thickness reinforcement apparatus with a fiber tape placement feed and stripper plates, in accordance with various embodiments.

It should be understood, that fiber placement using fiber tape feed out roller 270 and fiber tape 272 can be used together with various embodiments disclosed herein with respect to FIG. 1A through FIG. 10. For example, with reference to FIG. 11, which illustrates a schematic view of a through thickness reinforcement apparatus 802 with stripper plate 240 and stripper plate 250, in accordance with various embodiments. In various embodiments, apparatus 702 is similar to apparatus 502 as described with respect to FIG. 5, except that apparatus 802 further includes fiber tape feed out roller 270 configured to supply fiber tape 272 for through thickness reinforcement between veil cloth 220 and fibrous preform 230. In FIG. 12, housing 208 is omitted for case of illustration; though it should be understood that the components illustrated in FIG. 12 can be mounted to a common housing (e.g., housing 208). It should further be understood that apparatus 702 may include only stripper plate 250 without stripper plate 240 (see FIG. 4), may include only stripper plate 240 without stripper plate 250 (see FIG. 3A and FIG. 3B), or may include both stripper plate 240 and stripper plate 250. When used without stripper plate 240, the rollers 244, 246 may be omitted. With respect to FIG. 12, elements with like element numbering, as depicted in FIG. 2A, FIG. 2B, and FIG. 5, are intended to be the same and will not necessarily be repeated for the sake of clarity.

Systems and methods of the present disclosure include a tool for producing composite preforms with tailored in-plane and interlaminar properties. Systems and methods of the present disclosure enable the ability to needle on a complex contour preform. Systems and methods of the present disclosure allow for precisely controlling and programing needling location, angle, depth, and areal density. Systems and methods of the present disclosure allow spatially varying the needling parameters to vary interlaminar versus in-plane properties based on the desired application. Systems and methods of the present disclosure enable fabrication of 2.5D complex contour composite preforms for aerospace structures. Systems and methods of the present lend themselves to fully automated fabrication to reduce costs, improve reproducibility, and scale to production rates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An apparatus for through thickness reinforcement of a fibrous preform, the apparatus comprising:
    an actuating needle board including a plurality of textile needles extending therefrom;
    a feeder spool configured to supply a veil cloth;
    a take up spool configured to receive the veil cloth;
    a first roller;
    a second roller;
    a first stripper plate configured to be disposed between the veil cloth and the fibrous preform, the first stripper plate is configured to space apart the veil cloth from the fibrous preform to aid in complete through thickness fiber separation from the veil cloth prior to insertion of the through thickness fiber into the fibrous preform;
    a third roller mounted to the first stripper plate; and
    a fourth roller mounted to the first stripper plate;
    wherein the first roller is configured to guide the veil cloth from the feeder spool to the second roller, and the second roller is configured to guide the veil cloth from the first roller to the take up spool, and
    the actuating needle board is configured to move with respect to the first roller and the second roller between a retracted position and an extended position for moving through thickness fibers from the veil cloth to the fibrous preform.

2. The apparatus of claim 1, wherein the take up spool is configured to receive a needled portion of the veil cloth.

3. The apparatus of claim 1, further comprising a housing, wherein the actuating needle board is configured to move with respect to the housing between the retracted position and the extended position.

4. The apparatus of claim 3, wherein the actuating needle board, the feeder spool, the take up spool, the first roller, and the second roller are mounted to the housing.

5. The apparatus of claim 1, further comprising a fiber tape feed out roller configured to supply a fiber tape between the veil cloth and the fibrous preform.

6. The apparatus of claim 1, further comprising a second stripper plate configured to be disposed between the veil cloth and the actuating needle board, wherein the second stripper plate is configured to at least partially receive the plurality of textile needles.

7. The apparatus of claim 3, wherein the housing comprises an attachment member for coupling the housing to a robotic arm.

8. The apparatus of claim 1, wherein the actuating needle board is located between the feeder spool and the take up spool.

9. An apparatus for through thickness reinforcement of a fibrous preform, the apparatus comprising:
- a housing;
- a feeder spool mounted to the housing and configured to supply a veil cloth;
- a take up spool mounted to the housing and configured to receive the veil cloth; and
- a plurality of textile needles mounted to the housing and located between the feeder spool and the take up spool, wherein the plurality of textile needles is moveable with respect to the housing between a retracted position and an extended position for moving through thickness fibers from the veil cloth to the fibrous preform during a Z-needling operation;
- wherein the housing, the feeder spool, and the take up spool are configured to move together with respect to the fibrous preform during the Z-needling operation.

10. The apparatus of claim 9, further comprising a remote creel house, wherein the feeder spool is configured to receive the veil cloth from a material spool located in the remote creel house.

11. The apparatus of claim 10, wherein the creel house is configured to remain stationary and the housing, the feeder spool, and the take up spool are configured to move together with respect to the creel house during the Z-needling operation.

12. The apparatus of claim 9, wherein the through thickness fibers are configured to remain in the fibrous preform after being moved from the veil cloth to the fibrous preform during the Z-needling operation for through thickness reinforcement of the fibrous preform, and the fibrous preform comprises a fibrous ply stack.

* * * * *